United States Patent [19]

Sointula

[11] Patent Number: 5,349,630
[45] Date of Patent: Sep. 20, 1994

[54] RADIO TELEPHONE SYSTEM

[75] Inventor: Erkka Sointula, Märynummi, Finland

[73] Assignee: Nokia Mobile Phones, Ltd., Salo, Finland

[21] Appl. No.: 109,630

[22] Filed: Aug. 20, 1993

[30] Foreign Application Priority Data

Sep. 1, 1992 [FI] Finland .................. 923923

[51] Int. Cl.⁵ .................. H04M 11/00; H04B 1/16
[52] U.S. Cl. .................. 379/58; 455/343; 455/56.1
[58] Field of Search .................. 379/58, 59, 60; 455/54.1, 56.1, 33.1, 33.2, 69, 343, 38.3, 127, 88

[56] References Cited

U.S. PATENT DOCUMENTS

| 3,906,166 | 8/1975 | Cooper et al. | 379/60 |
|---|---|---|---|
| 4,613,990 | 9/1986 | Halpern | 455/33.1 |
| 5,129,098 | 7/1992 | McGirr et al. | 455/69 |
| 5,206,970 | 4/1993 | Stengel et al. | 455/69 |

FOREIGN PATENT DOCUMENTS

| 0418096A3 | 3/1991 | European Pat. Off. | H04Q 7/04 |
|---|---|---|---|
| 0484918A2 | 5/1992 | European Pat. Off. | H04B 7/26 |
| 923923 | 7/1993 | Finland . | |

Primary Examiner—Curtis Kuntz
Assistant Examiner—I. Rana
Attorney, Agent, or Firm—Perman & Green

[57] ABSTRACT

A radio telephone system and method of operation thereof, wherein the power consumption of the mobile stations in the system is reduced. The system includes a base station, at least one auxiliary base station and at least one mobile station. The levels of the received signals are indicated at the base stations and their levels are compared. The one having the highest indicated level will be selected as the receiving base station. At the same time, the base station transmits the pilot message to the mobile station in order to adjust its transmission power to a suitably low level.

10 Claims, 1 Drawing Sheet

RADIO TELEPHONE SYSTEM

The invention relates to a radio telephone system and to a method of operation thereof. In particular the invention relates to the lowering of power consumption in mobile communication stations for example in the form of mobile and/or portable telephones.

BACKGROUND OF THE INVENTION

Minimizing the power consumption in mobile communication stations is important at the technical level because it is the battery life which often limits the available operation time of communication stations. Therefore, e.g. in mobile radio telephones, the stand-by state is commonly used, whereby the transmitter is cut off while waiting for a call. On the other hand, a battery saving system is known where, according to the quality of the connection, the telephone can be piloted by the base station to select its transmission power in two or more steps, so that the lowest possible power to produce satisfactory quality will be used. The power steps could, for instance, be 0,1 W; 1,0 W; 0,15 W; 1,5 W or 15 W. The use of a lower transmission power will contribute to the lowering of the power consumption and lengthen the available call time of the radio telephone accordingly.

For example, it is known to use a Mobile Assisted Handoff (MAHO) function in dual mode (analog and digital) cellular mobile telephone systems. More particularly, the EIA/TIA Interim Standard entitled "Cellular System Dual-Mode Mobile Station-Base Station Compatibility Standard" IS-54-B (April 1992) specifies the MAHO function in Section 2.4.5. Briefly, the MAHO function requires a mobile station to furnish RF channel signal-quality information to a fixed site base station that serves the mobile station. There are two types of channels upon which the mobile station performs signal measurements: (a) a currently assigned forward digital traffic channel, and (b) any other specified forward RF channel. The digital traffic channel has a Time Division Multiple Access (TDMA) format having six time slots that occur within a 40 millisecond frame.

For instance, where several base stations have overlapping coverage areas, each base station transmits with a unique, predetermined channel frequency, the channel frequencies being spaced apart from one another by 30 kHz. When the MAHO function is activated, the mobile station measures the received signal strength (RSSI) and estimates the Bit Error Rate (BER) of the current forward digital traffic channel. The MS also measures the RSSI and estimates the BER for the other channel during idle time slots. The various measurements and estimates made by the MS are employed to determine a next base station to which the MS will be assigned during a handoff procedure.

Today, the mobile communication stations are used in cars and other vehicles but also, their sizes having become smaller, in an increasing extent as portable pocket stations. Their use has increased in large office buildings, factories, railway stations and airports, and so on, when the interferences of the operational environment may require an increase in transmission power which will, in a disadvantageous way, shorten the available operation time of the station between battery chargings. On the other hand, there are also cases where radio telephones are desired to be continuously kept in the call state, and then the power consumption will be high.

SUMMARY OF THE INVENTION

According to a first aspect of the present invention there is provided a method of operation of a radio telephone system comprising a base station, at least one auxiliary base station located within the coverage area of the base station and at least one mobile station, the method comprising the steps of:

i) receiving a signal from a mobile station at the base station and at an auxiliary base station;

ii) producing a signal (RSSI1) characteristic of the received signal strength for the signal received from the mobile station at the base station and a signal (RSSI2) characteristic of the received signal strength for the signal received from the mobile station at the auxiliary base station;

iii) comparing the signals RSSI1 and RSSI2; and iv) transmitting a pilot signal to the mobile station instructing the mobile station to reduce the power of the transmitted signal to a level which can be detected by the base station only, when the magnitude of RSSI1 is greater than the magnitude of RSSI2 or to reduce the power level of the transmitted signal to a level which can be detected by the auxiliary base station only, when the magnitude of RSSI2 is greater than the magnitude of RSSI1, in which case the auxiliary base station retransmits the signal received from the mobile station to the base station, in order that the mobile station will transmit via the more efficient route and thus reduce power consumption in the mobile station.

According to a second aspect of the present invention there is provided a radio telephone system comprising a base station, at least one auxiliary base station located within the coverage area of the base station and at least one mobile station, wherein the auxiliary base station is capable of receiving a signal from a mobile station, producing a signal (RSSI2) characteristic of the strength of the received signal and transmitting the received signal and the signal (RSSI2) characteristic of the signal strength at the auxiliary base station;

the base station being capable of receiving a signal from the mobile station and producing a signal (RSSI1) characteristic of the strength of the signal received at the base station from the mobile station, and of receiving the signal transmitted by the auxiliary base station and comparing the two signals RSSI1 and RSSI2 and of producing a pilot signal to the mobile station instructing the mobile station to reduce the power of the transmitted signal to a level which can be detected by the base station only when the magnitude of RSSI1 is greater than the magnitude of RSSI2 or to reduce the power level of the transmitted signal to a level which can be detected by the auxiliary base station only when the magnitude of RSSI2 is greater than the magnitude of RSSI1, in which case the auxiliary base station retransmits the signal received from the mobile station to the base station, in order that the mobile station will transmit via the more efficient route and thus reduce power consumption in the mobile station.

An advantage of the invention is the provision of both a method and a radio telephone system, whereby the power consumption of a radio communication station will be adjusted according to the required signal quality, following the above mentioned system.

When auxiliary base stations are arranged in the base station area at suitable locations, for instance, at airports, harbours, coach-stations, large construction sites, the mobile communication station within the coverage area of the base station is able to transmit the message also via the auxiliary base station, in addition to the base station. Then, in accordance with the invention, the strongest reception signal is selected, i.e. the signal received either by the base station or the auxiliary base station, and the mobile communication station is piloted to use the lowest possible transmission power via the reception station selected. The transmission in the direction of the mobile station takes place from the ordinary base station. With the arrangement in accordance with the invention, the call time of the mobile telephone can be essentially lengthened or, accordingly, smaller batteries can be used in the telephones.

Auxiliary stations in accordance with the invention can especially be placed in the peripheries of the base station. As the maximum transmission power of the mobile communication station usually is limited by regulations, by this way it is possible to enhance the connection quality in the periphery areas of the base station.

The method and station arrangement in accordance with the invention can, in particular, be used in the analogue radio telephone systems, such as the Nordic NMT, and AMPS, TACS, and other systems well-known to those competent in the art. However, the invention may also be applied in the digital systems, among which the CDMA system may be mentioned as an example.

BRIEF DESCRIPTION OF THE DRAWINGS

An embodiment of the present invention is described below, by way of example, with reference to the accompanying drawings, in which.

DETAILED DESCRIPTION OF THE INVENTION

Figure 1:
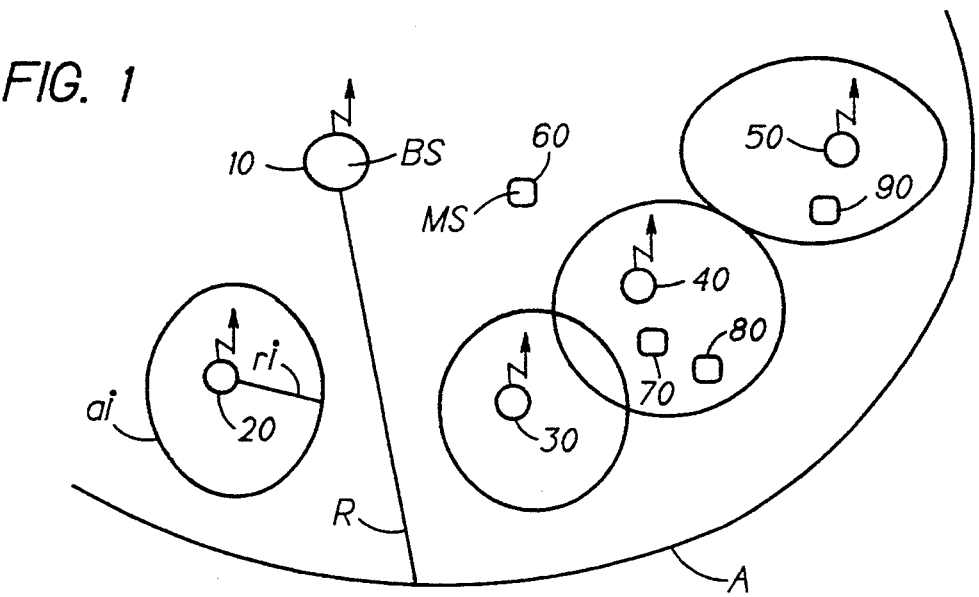
FIG. 1 shows the auxiliary base stations arranged in the base station area.

In FIG. 1, the radio telephone system comprises a base station 10 serving a coverage area within the range of radius R, presented diagramatically as the curve A. In accordance with the invention, there is an arrangement of auxiliary base stations 20, 30, 40, 50 within the range of the base station. Every auxiliary base station 20, 30, 40, 50, or separate reception point, has a smaller coverage area of its own, indicated by an ellipse and at the station 20 with reference numbers ri, ai. In the range of the base station, there are moving mobile stations (MS), typically radio telephones 60, 70, 80, 90 that can also move within the ranges of the auxiliary base stations.

Figure 2:
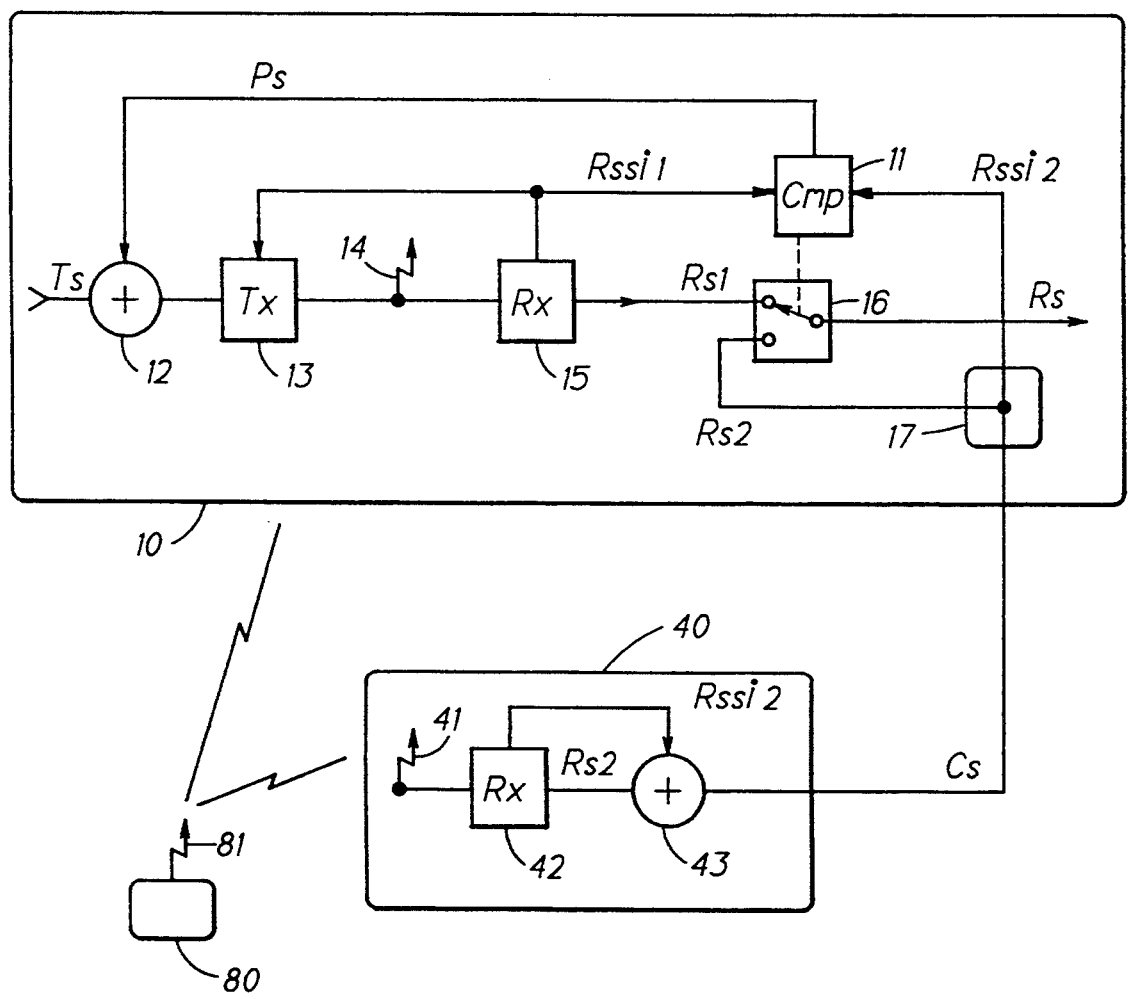
FIG. 2 shows a simplified block diagram where the arrangement of the base station and the auxiliary base stations in accordance with the invention is illustrated.

The base station 10 is connected in a known way to the center (not shown) allowing the creation of connections between mobile communication stations and/or to the telephones or to the terminal stations of mobile communication stations or fixed telephone networks. The connections are typically in two directions and from its antenna 14 (FIG. 2). The base station 10 is able to transmit to the communications stations 60, 70, 80, 90 dispatches including utility information or speech and pilot messages. The content and structure of the pilot messages depend on the radio telephone system but, taking the aspects of this invention in consideration, it is essential that it can, in a known way, contain a signal piloting the transmission power of the station. In the second direction, the signal transmitted by the antenna 81 of the mobile communication station is received in accordance with the invention, by the antenna 14 of the base station and/or by one or several of the base stations (FIG. 2 by antenna 14). In the arrangement the best signal received is chosen, i.e. that with the highest power level in reception.

The arrangement is illustrated in FIG. 2 by a simplified block diagram showing the base station 10 and one auxiliary base station 40. The mobile communication stations in the coverage area of the base station are represented by a mobile telephone 80.

A low frequency utility signal Ts is received from the centre by the base station 10, to be sent further to the mobile telephone 80, and, respectively, the signal from the mobile telephone is directed as a low frequency utility signal Rs to the centre or to the retransmission point.

The base station 10, includes an antenna 14, whereto the transmission part 13 and the reception part 15 have been connected via a duplex filter (not shown). Their structures are known as such and will not be described in detail here. From the reception part 15 a low frequency signal Rsl is directed to the control circuit 16 and the signal to be transmitted Ts is brought to the transmitter 13 via the connecting circuit 12. In the receiver 15, there is also an indication circuit (not shown) for signal level, indicating the level transmitted by the mobile telephone 80 and producing to its output the corresponding signal Rssil (Received Signal Strength Indicator). The transmission power of the transmitter 13 can be piloted by the Rssil signal in the way shown in the figure.

By the signal Rssi of the indicated level, it is also possible to pilot the mobile telephone 80 to the right transmission power, by feeding the control signal derived from the Rssi signal to the signal combination circuit 12, and further to be sent to the mobile telephone 80, via transmitter 13 and antenna 14, as a transmission signal combined with the utility signal Ts. If, for instance, the mobile telephone 80 is physically very near the base station 10, and the conditions otherwise are good, the mobile telephone can, for instance, be piloted to the power of 100 mW. If the mobile telephone were further away, maybe a higher transmission power, say 1 W or more, would be needed.

The auxiliary base station 40 only comprises circuits connected for reception. From antenna 41 the radio frequency signal is piloted to the reception part 42, wherefrom the low frequency signal Rs2 and the level indication signal Rssi2 are obtained, in the same way as at the base station 10, which signals are then combined by the combination circuit 43. The combined output signal Cs from the combination circuit 43 is piloted to the base station, for instance, by a cable connection.

The base station 10 comprises the branching circuit 17 of the signal Cs coming from the auxiliary base station 40 and from this branching circuit 17 the low frequency signal Rs 2 is piloted to the selection circuit 16 and the level indication signal Rssi2 to the comparison circuit 11 (Cmp). The second input signal of the comparison circuit 11 is Rssil and the output signal the output power control signal Ps that is piloted to the combination circuit 12.

The combination circuit 12 may, in any known way, transform or code the power signal Ps and combine the transformation result with the utility signal Ts. Respectively, the combination circuit 43 may relay the low frequency signal Rs2 further, as a base frequency signal, and add the level indication signal Rssi2 into it in the form of a suitably modified signal, e.g. as a direct voltage level or as an alternating current signal below or above the low frequency signal Rs2. The branching circuit 17 of the base station comprises, according to the selected transformation mode, the reverse transformation circuits to make the level indication signal Rssi2 conform with the signal Rssi1 indicated by the base station.

In practical use, the arrangement will operate as follows. When the connection between the mobile communication station and the base station(s) is initiated and is operative, the mobile telephone 80 transmits a signal that is received at the base station 10 and at one of the auxiliary base stations, in this case at the station 40. The arrangement will operate even when the reception, in bad conditions, would only take place at one of the stations. The low frequency signals Rs1 and Rs2 received by the base stations are piloted to the respective inputs of the selection circuit 16. The indicated level signals Rssi1 and Rssi2 are piloted to the comparison circuit 11 that will select, in the beginning of the connection and e.g. with predetermined intervals during it, a better reception route, that is to say, the route represented by the signals Rssi1 or Rssi2, representing the higher reception level. In the case illustrated in FIG. 2, the more powerful signal has been received from the base station 10. According to the selection by the comparison circuit 11, it will pilot the selection circuit 16 to switch on the selected station signal, in this case, the signal Rs1 as the low frequency output signal Rs. The comparison circuit 11 will at the same time derive from the level indication signal the mobile telephone transmission power control signal Ps, which in this case is comparable with the signal Rssi1, and feeds it to the combination circuit 12.

When there are several auxiliary base stations, as in FIG. 1, the inputs of the comparison circuit 11 comprise all of the level signals Rssi of the respective base stations and the selection in this circuit is made by a way well-known to those competent in the art. Respectively, the inputs of the selection circuit 16 are the low frequency utility signals of all of the base stations, out of which the output signal Rs is selected by a corresponding multiterminal selection switch or matrix.

When the invention is employed e.g. in the CDMA system, a quality data like SNR for example can be used as a selection criterion instead of Rssi. The so called closed-loop power measurement (effected by the base station) is typically based on SNR in the CDMA system.

The internal structure of the circuits is not described in detail here, as they can be made in several known ways, following the description given above. Thus, for instance, the selection circuit 16 is possible to make with a mechanical switch, with an electronic switch or with a digital switching circuit. It is also thinkable that the comparison and the selection circuits are made by a microprocessor with a suitable software to carry out the method according to the invention and with any suitable feeding/output circuits to connect the other parts and signal routes of the arrangement according to the invention.

The signal connection between the base station and the auxiliary base station to transfer the combined signal Cs may be done, in addition to the cable routing, also e.g. via a radio link by which also the signals used in the control and supervision of the auxiliary base station are transferred.

Also, the auxiliary base station can be merely constituted by an amplifier providing an uplink signal. In such case, no cable line or radio link is required to the auxiliary base station.

In view of the foregoing it will be clear to a person skilled in the art that modifications may be incorporated without departing from the scope of the present invention.

What we claim is:

1. A method of operation of a radio telephone system comprising a base station, at least one auxiliary base station located within the coverage area of the base station and at least one mobile station, the method comprising the steps of:
   i) in response to initiating a communication between the base station and a mobile station, receiving a signal from a mobile station at the base station and at an auxiliary base station;
   ii) producing a signal (RSSI1) characteristic of the received signal strength for the signal received from the mobile station at the base station and producing a signal (RSSI2) characteristic of the received signal strength for the signal received from the mobile station at the auxiliary base station; transmitting the signal RSSI2 from the auxiliary base station to the base station, wherein the signal transmitted from the mobile station to the auxiliary base station and the signal (RSSI2) characteristic of the received signal strength produced at the auxiliary base station are transmitted to the base station as a combined signal;
   iii) comparing at the base station the signals RSSI1 and RSSI2; and
   iv) transmitting a pilot signal from the base station to the mobile station instructing the mobile station to reduce the power of the transmitted signal to a level which can be detected only by the base station, when the magnitude of RSSI1 is greater than the magnitude of RSSI2, or to reduce the power level of the transmitted signal to a level which can be detected only by the auxiliary base station, and not by the base station, when the magnitude of RSSI2 is greater than the magnitude of RSSI1, in which case the auxiliary base station re-transmits the signal received from the mobile station to the base station, in order that the mobile station transmitter power is set to a level to cause transmission via a route that consumes a least amount of mobile station power.

2. A method as claimed in claim 1, wherein the transmission power of the transmitted signal is reduced to the minimum level while still enabling the initiated communication to proceed.

3. A radio telephone system comprising a base station, at least one auxiliary base station located within the coverage area of the base station and at least one mobile station, wherein the auxiliary base station is capable of receiving a signal from a mobile station, producing a signal (RSSI1) characteristic of the strength of the received signal and transmitting the received signal and the signal (RSSI2) characteristic of the signal strength at the auxiliary base station;

the base station including means for receiving a signal from the mobile station and for producing a signal (RSSI2) characteristic of the strength of the signal received at the base station from the mobile station, the base station further comprising means for receiving the signal transmitted by the auxiliary base station and for comparing the two signals RSSI1 and RSSI2, the base station further comprising means for producing a pilot signal to the mobile station instructing the mobile station to reduce the power of the transmitted signal to a level which can be detected only by the base station, when the magnitude of RSSI1 is greater than the magnitude of RSSI2, or to reduce the power level of the transmitted signal to a level which can be detected only by the auxiliary base station, and not by the base station, when the magnitude of RSSI2 is greater than the magnitude of RSSI1, in which case the auxiliary base station retransmits the signal received from the mobile station to the base station, in order that the mobile station transmitter power is set to a level to cause transmission via a route that consumes a least amount of mobile station power wherein the auxiliary base station comprises a combination circuit, the inputs of which are a signal received from the mobile station and a level indication signal produced by the auxiliary base station (RSSI2), and wherein the output of the combination circuit is a combined signal (Cs) to be transmitted to the base station.

4. A system as claimed in claim 3, wherein the base station includes a reception and branching circuit which receives the combined signal (Cs), wherein the outputs of said reception and branching circuit are the signal from the mobile station and the level indication signal (RSSI2).

5. A system as claimed in claim 3, when the at least one auxiliary station is coupled to the base station via a land-line.

6. A system as claimed in claim 3, wherein the at least one auxiliary station is coupled to the base station via a radio link.

7. A method as claimed in claim 1, wherein the radio telephone system is an analog mobile telephone system.

8. A system as claimed in claim 3, wherein the radio telephone system is an analog mobile telephone system.

9. A method as claimed in claim 1, wherein the radio telephone system is a digital mobile telephone system.

10. A system as claimed in claim 3, wherein the radio telephone system is a digital mobile telephone system.

* * * * *